(12) United States Patent
Jun et al.

(10) Patent No.: US 7,362,949 B2
(45) Date of Patent: Apr. 22, 2008

(54) INTELLIGENT VIDEO SYSTEM

(75) Inventors: Sung Bae Jun, Seoul (KR); Kyoung Ro Yoon, Seoul (KR); Ji Eun Lee, Seoul (KR); Sang Yong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1349 days.

(21) Appl. No.: 09/964,533

(22) Filed: Sep. 28, 2001

(65) Prior Publication Data

US 2002/0039481 A1 Apr. 4, 2002

(30) Foreign Application Priority Data

Sep. 30, 2000 (KR) .............................. 2000-57722

(51) Int. Cl.
*H04N 5/91* (2006.01)
(52) U.S. Cl. ..................... 386/68; 386/46; 386/69; 386/125; 386/126
(58) Field of Classification Search ................. 386/68, 386/125–126, 45, 96, 46, 95, 70, 75, 104, 386/81; 360/33.1, 10.1–10.3
See application file for complete search history.

(56) References Cited

U.S. PATENT DOCUMENTS

| | | | | |
|---|---|---|---|---|
| 5,377,051 A | * | 12/1994 | Lane et al. .................... 386/81 |
| 5,576,902 A | * | 11/1996 | Lane et al. .................... 386/68 |
| 5,615,018 A | * | 3/1997 | Wu et al. ...................... 386/68 |
| 6,400,996 B1 | * | 6/2002 | Hoffberg et al. .............. 700/83 |
| 6,556,775 B1 | * | 4/2003 | Shimada ..................... 386/121 |
| 7,031,595 B2 | * | 4/2006 | Yamaguchi .................. 386/68 |
| 7,110,658 B1 | * | 9/2006 | Iggulden et al. .............. 386/46 |
| 7,149,412 B2 | * | 12/2006 | Blair et al. .................... 386/75 |

\* cited by examiner

*Primary Examiner*—John Miller
*Assistant Examiner*—Jamie J Vent
(74) *Attorney, Agent, or Firm*—Ked & Associates, LLP

(57) ABSTRACT

Described is an intelligent fast-forward video system that automatically controls a relative play speed of the video based on a complexity of the content reflecting the real story of a video, thereby enabling to carry out a fast-forward viewing for summarizing an entire story of a digital video or moving fast to a major concerning part. The present invention obtains the complexity of the content using information of motion vector, shot, face, text, and audio for an entire video and adaptively controls the play speed for each of the intervals on a fast-forward viewing of the corresponding video on the basis of the obtained complexity of the content. And, in more detail, the present invention plays a complicated story interval relatively slow and a simple and tedious part relatively fast, thereby enabling to provide a user with a summarized story of the corresponding video without viewing the entire video as well as a fast search for a part wanted by the user.

30 Claims, 3 Drawing Sheets

INTELLIGENT VIDEO SYSTEM

BACKGROUND OF THE INVENTION

1. Field of the Invention

The present invention relates to a video system for automatically controlling a play speed based on complexity of video image contents. Particularly, the present invention relates to an intelligent fast-forward digital video system, which indexes entire video contents based on the content complexity and then controls relative play speed of the video based on the indexing information.

More specifically, the present invention relates to a method of defining the video content complexity using the information reflecting substantially the meanings of video content development, a method of controlling play speed based on the defined complexity, a method of selectively reproducing frames to play MPEG video at the FF mode without adjusting a frame rate, and a system for realizing various playing speeds in accordance with the moving picture species or contents or user's taste and demand.

2. Background of the Related Art

In a conventional speed-shift mode of moving pictures, the shift speed is fixed to a constant value through all the sections on speed shifting.

However, such a speed shifting technology fails to satisfy the visual characteristics of a user when the regeneration is played at a Fast or Slow mode.

For instance, when the regeneration is played at a fast uniform speed, the user is unable to recognize the scene due to the fast transformation of the abrupt change of pictures according to the time. On the other hand, when the change of pictures is slow, the regeneration is played too slow to realize the fast display.

Moreover, when the regeneration is played slow, the user hardly recognize the wanted pictures passing too fast during the abruptly-varying scenes as well as feels tedious for the slow scenes running slower.

If the FF mode is executed for high-speed search, the slow-forward mode is carried out for looking into specific scenes in detail. Considering the substantial user's visual aspect, the user expects to slow-shift of the scenes during the abrupt-changed scenes, and vice versa.

Unfortunately, the fixed fast/slow shift play fails to meet the user's demand.

Therefore, the above problem may be solved by automatically controlling the play speed of moving pictures by adaptively changing the play speed in accordance with the picture change ratio in a speed shift interval.

Such a technology of an automatic controlling method of adaptive speed of moving pictures is disclosed in Korean Laid-open No. 1000-00813 published in Nov. 15, 1999, in which the speed in the shift regenerative interval is adapted to the human visual characteristics in accordance with the moving picture characteristics by varying the play speed in the executed intervals fast or slow in accordance with the movement change ratio of the pictures by detecting cuts and using the picture difference between the frame number among the cuts and the adjacent frame.

FIG. 1 shows a block diagram of a system for automatically controlling an adaptive speed of moving pictures.

Referring to FIG. 1, a speed control information detection module 102 detects the moving picture variation for controlling the play shift speed in a shift interval of a digital moving picture file 101. And, the speed control information detection module 102 further consists of a cut detection module 102a extracting cuts from moving pictures and calculating the number of frames between the cuts and a differential picture detection module 102b finding and storing a differential picture between the frames in the moving pictures. A first storage module 103 stores moving pictures data for speed shift which contain the detection information of the cut detection module 102a and the differential picture detection module 102b. A second storage module 104 stores moving picture data for constant speed. And, a display module 105 controls the display speed instantly fast or slow in a shift interval by judging the variation degree of the moving pictures from the frame number between the cuts and the differential pictures between the frames.

The cut detection module 102a extracts and stores the cut detection for judging the scene conversion, indexing of the detected cuts, and information of a distance(frame number) between the cuts.

The differential picture detection module 102b stores the variation degree of scenes by detecting the differential pictures between the respective frames.

The display module 105 has an algorithm related to the speed and the distance between the cuts enabling to control the speed through the distance(frame number) between the extracted cuts when an FF mode is selected and another algorithm related to the speed and the detected scene variation ratio and speed when a slow-forward(SF) mode is selected.

A conception of a system for controlling play speeds automatically in accordance with the image complexity has been introduced by a display system for controlling a play speed automatically in accordance with the variation ratio of scenes. Yet, this conception defines the scene variation as a differential picture by 'image complexity' based on an moving picture difference between adjacent frames.

Therefore, in case of defining the motion as the differential picture, long processing time is required because entire pixels should be compared.

Moreover, when the image complexity is defined by the differential picture, in the case of an having great differences in background and color despite having the same motions, the motion of the object is over-calculated despite a small motion so as to be regenerated slowly. Thus, the motion of the object fails to reach a wanted play speed substantially. Namely, in order to understand the development of a video story substantially, the image complexity is attained by the differential moving pictures by regarding the complexity of the image itself as a content complexity instead of adjusting the play speed by putting a much value on a meaningful story development.

Besides, the difference between the foregoing and following pictures in the substantial story development of a video is unable to consider the meanings of the story sufficiently. And, the complexity of the story contents may be understood differently in accordance with the story development as well as the simple difference of the pictures. For instance, it is assumed that the conversation scene of the characters in a drama goes on tediously, which may be judged as a complicated image due to the picture difference caused by the frequently-changed locations of a camera. Therefore the regeneration of the scene is played slowly. Yet, it would be better to play this scene part fast even though the conversation scene of the characters goes on tediously somewhat long.

The above problem is caused by the difficulty in judging with the differential pictures by calculating automatically 'content complexity' which reflects the substantial meaning of contents in accordance with the genre, use, and story of moving pictures. In an aspect of real content development of a video, the 'content complexity' of a video reflects the 'content complexity' felt by a user only when motion information, shot information, face information(detection information of a specific object as a crucial element of the content development) of characters, text information, audio information and the like as well as the differential pictures are totally taken into consideration.

SUMMARY OF THE INVENTION

Accordingly, the present invention is directed to an intelligent fast-forward video system that substantially obviates one or more of the problems due to limitations and disadvantages of the related art.

An object of the present invention is to provide an intelligent fast-forward video system that controls a relative play speed of the video based on a complexity of the video content.

Another object of the present invention is to provide an intelligent fast-forward video system that plays relatively complex video content at a standpoint of story development more slowly and plays relatively simple video content at a standpoint of story development faster.

Further object of the present invention is to provide an index data structure reflecting a complexity of video data and a method for adaptively controlling the relative play speed using the index data.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

An intelligent fast-forward video system according to the present invention is characterized by that play speed is controlled in relatively fast or slow speed based on a content complexity at a standpoint of a story development.

The present invention is characterized by that motion information to reflect content complexity of a video is defined by motion vectors and that information of shot segment, character's face, image text, and audio is used to reflect the content complexity of a video entirely or totally.

And, an intelligent fast-forward video system according to the present invention is characterized by an index information structure processed as a form enabling to designate a play speed in accordance with the content complexity.

Moreover, an intelligent fast-forward video system according to the present invention is characterized by that the play speed designated by the content complexity is variably controlled adaptively in accordance with a speed redefined (asked) by a user.

To achieve these and other advantages, and in accordance with the purpose of the present invention as embodied and broadly described, an intelligent fast-forward video system according to the present invention includes a means for calculating a complexity of the video content in accordance with story development of a corresponding video from a digital video stream including at least motion information, a means for generating information which designates a play speed in a specific interval of the corresponding video on the basis of the computed content complexity, a means for storing the generated speed designation information, and a means for playing and displaying the corresponding video in different play speeds in each specific interval on the basis of the stored speed designation information.

Preferably, the speed designation information is one of the specific interval of the video and image complexity in the specific interval, a speed value in the video interval and corresponding interval, and a frame sequence corresponding to the play speed.

And, the digital video stream contains shot information, face information of character, image text information, and audio information for producing the content complexity.

Moreover, the play speed is readjusted by a user's designation at a playing stage.

Further preferably, the play speed is controlled by the content complexity, which is computed by automatically reflecting additional information according to a genre or by reflecting the additional information by a user's designation and selection.

In another aspect, a method of controlling an intelligent fast-forward video system according to the present invention includes the steps of finding complexity of a video story development based on motion information by indexing an entire video in order, determining a play speed using the found motion-based complexity, and controlling the play speed of the video in accordance with the determined play speed by accelerating speed shift.

In a further aspect, in controlling a play speed of a video based on content complexity by accelerating speed shift to calculate complexity of video story development with motion information by sequentially indexing the entire video, a method of constructing index information for controlling an intelligent fast-forward viewing according to the present invention includes a step of constructing the content complexity information with index information defined as a predetermined form enabling to designate each play speed of the corresponding complexity.

An advantage of the present invention is the provision of a system for controlling a play speed of a video automatically, in which the play speeds in the respective intervals are decreased or increased in accordance with complexity of video image contents.

Another advantage of the present invention is the provision of a system, in which play speed information is attained by indexing total video contents in accordance with the content complexity and then the play speed in the video interval corresponding to the complex part based on the indexing information is decreased to slow down or the play speed in the video interval corresponding to the simple and boring part of the video contents is increased to be accelerated relatively.

A further advantage of the present invention is the provision of a system and methods thereof, in which information structures of index data reflecting the content complexity of the video, a method of redefining a play speed by being added to a shifted-speed play speed determined by the index information by a user and controlling a play speed different from another play speed in accordance with the index information by considering the redefined play speed, and an intelligent fast-forward video play system are proposed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
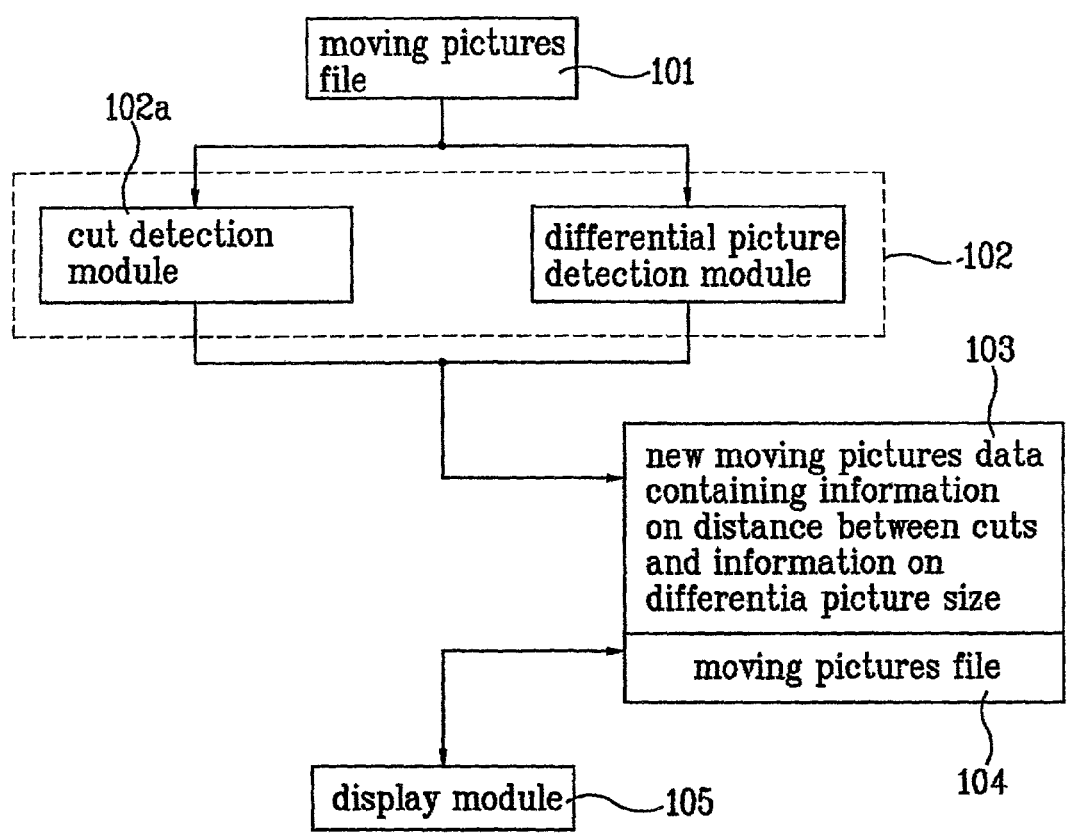
FIG. 1 shows a block diagram of a system for automatically controlling a play speed of digital moving pictures according to a related art.

In the present invention of an intelligent fast-forward system, it is intended that a play speed is increased relatively fast or decreased relatively slow based on 'content complexity' in an aspect of real story development of a video when a fast-forward mode is executed.

Reference will now be made in detail to the preferred embodiments of the present invention, examples of which are illustrated in the accompanying drawings. Where possible, the same reference numerals will be used to illustrate like elements throughout the specification.

An intelligent fast-forward viewing function of the present invention enables to have a user acquire lots of many information as far as possible on viewing at a fast-forward mode (I-FF) by playing the complicated parts of image relatively slow and the simple parts relatively fast.

Figure 2:
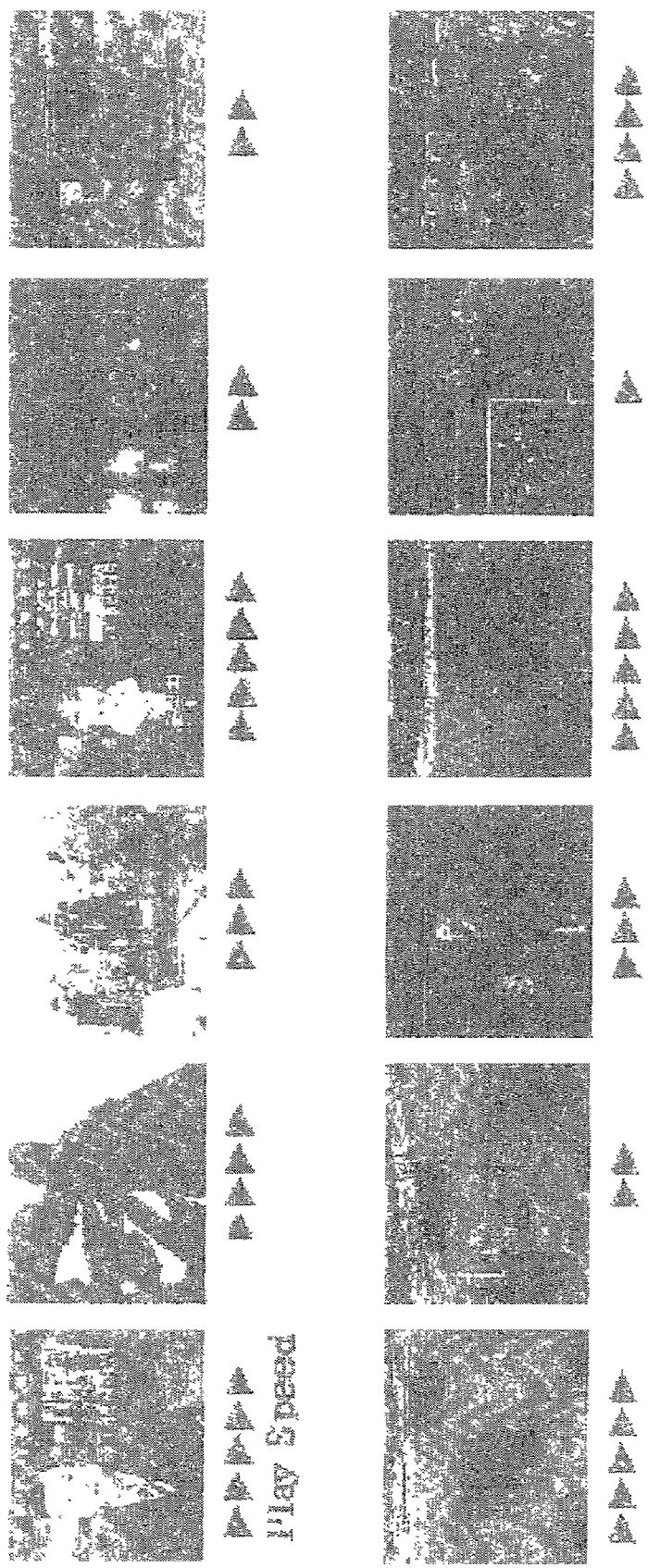
FIG. 2 shows pictures for explaining the concepts of an intelligent fast-forward video system according to the present invention.

FIG. 2 shows pictures for explaining the concepts of an intelligent fast-forward video system according to the present invention, wherein the number of triangles appearing at lower parts of the respective pictures designates the respective fast-forward speeds.

For example, when a user watches a news program at a fast forward mode(I-FF), an article narrated by an anchorman is played relatively faster, while some intervals are played relatively slow in accordance with the content complexity of the subjects in the material images of the article. If a user watches a football game at a fast-forward mode (I-FF), tedious scenes in which players run on a middle field are played with faster speed and important scenes such as shooting, goal-in scenes and the like are regenerated with less faster speed. Such a function requires a process of generating indices of content importance and complexity of contents of an entire video.

Figure 3:
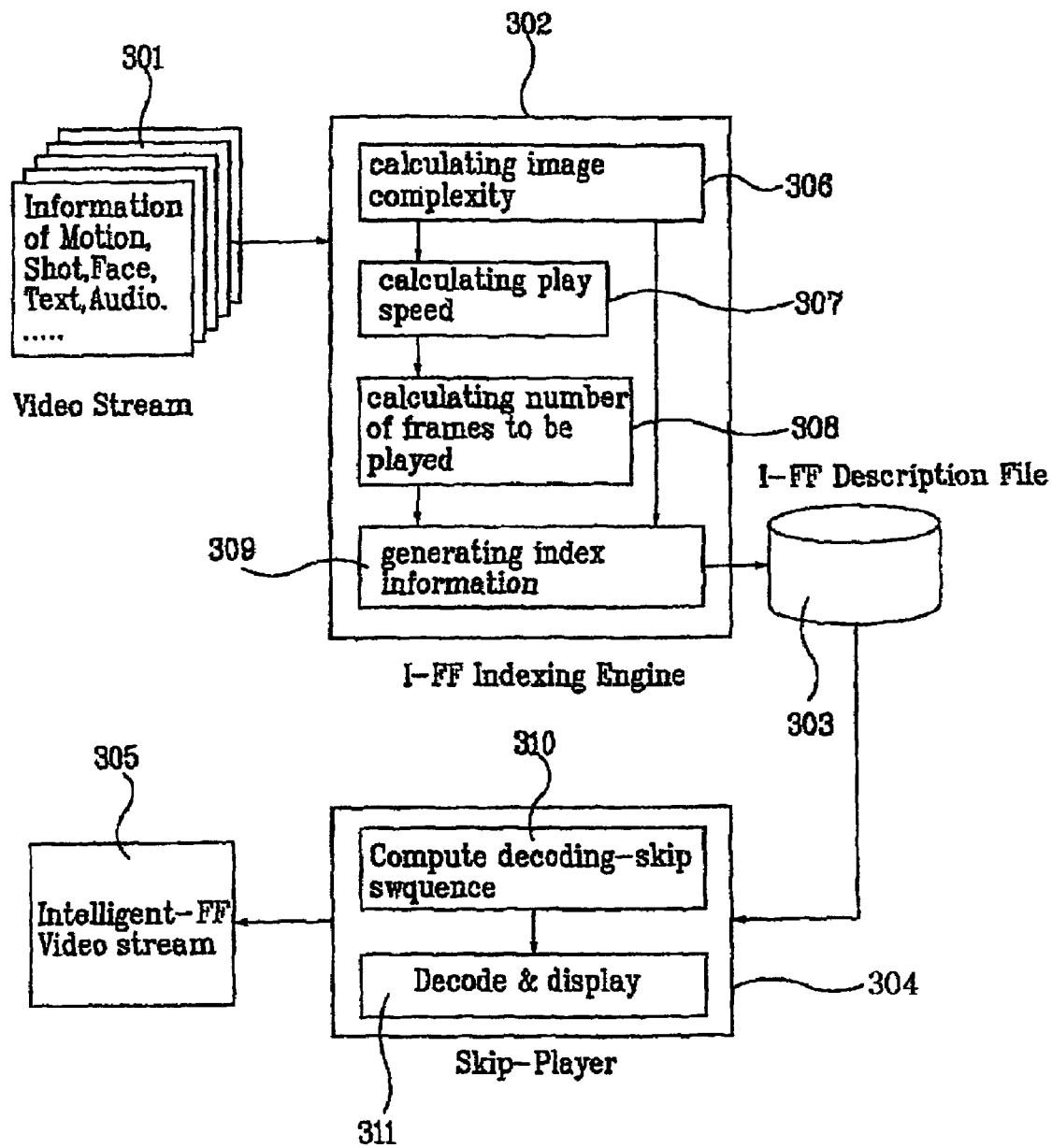
FIG. 3 shows a block diagram of an intelligent fast-forward video system according to the present invention.

FIG. 3 shows a block diagram of an intelligent fast-forward video system according to an embodiment of the present invention.

Referring to FIG. 3, a video stream 301 includes information of motion, shot, face detection, text, audio and the like. An intelligent fast-forward view indexing part 302 produces index information for an intelligent fast-forward viewing of the present invention using the video data information inputted from the video stream 301. A storage part 303 stores the information (with the video stream) produced by the indexing part 302. A skip player 304 carries out an intelligent play speed control of the corresponding video based on the index information from the storage part 303 and may display or output 305 the video of which play speed is controlled.

The indexing part 302 may belong to one of the following three index structures. Thus, an index storage method (index information structure) also belongs to one of three types in accordance with the three structures of the indexing part 302.

First, the indexing part 302 may include a complexity computing part 306 calculating a content complexity based on motion information and the like from the video stream 301 and an index information generating part 309 processing the complexity information for an intelligent fast-forward viewing of the corresponding video stream so as to generate an index information.

When the video stream 301 is inputted in FIG. 3, the indexing part 302 computes content complexity values of the respective frame (306). In this case, an average of the content complexity values defined to the respective frames is computed as a content complexity value of continuous intervals, in which a length of the continuous intervals is grouped to be equal to or longer than a pre-designated minimum length and the groups having consecutive similar values are bound into one interval again. Then, the produced complexity information of the video content is stored in the storage part 303 as an index file I-FF Description File from the index information generating part 309.

In this case, the index information structure is stored as <initial interval frame number, end interval frame number, content complexity>, in which the computed play frame numbers (initial and end frame numbers) corresponding to the computed content complexity and the complexity value are stored as an index file.

Second, the indexing part 302 may include a complexity computing part 306 calculating a content complexity based on motion information and the like from the video stream 301, a speed computing part 307 calculating a play speed according to the computed complexity, and an index information generating part 309 processing the play speed information into index information for an intelligent fast-forward viewing of the corresponding video stream.

When the video stream 301 is inputted in FIG. 3, the indexing part 302 computes content complexity values of the respective frame (306). In this case, the defined content complexity values of the respective frames are computed as content complexity values of the consecutive intervals of which lengths are grouped to be equal to or longer than a pre-designated length, in which some of the groups having consecutive similar values are bound into one interval again. Then, a play speed is calculated based on the content complexity. And, the play speed is inverse-proportional to the content complexity. Thus, the produced complexity information of the video content is stored in the storage part 303 as an index file I-FF Description File from the index information generating part 309.

In this case, the index information structure is stored as <initial interval frame number, end interval frame number, play speed>, in which the computed frame numbers(initial and end frame numbers) corresponding to the computed play speed and the play speed itself computed by the content complexity are stored as an index file.

Third, the indexing part 302 may include a complexity computing part 306 calculating a complexity of the content based on motion information and the like from the video stream 301, a speed computing part 307 calculating a play speed according to the computed complexity, a play frame number computing part 308 calculating a play frame number for the playing corresponding to the computed speed, and an index information generating part 309 processing the play frame information into index information for an intelligent fast-forward viewing of the corresponding video stream.

When the video stream 301 is inputted in FIG. 3, the indexing part 302 computes content complexity values of the respective frame (306). In this case, an average of the content complexity values defined to the respective frames is computed as a content complexity value of continuous intervals, in which a length of the continuous intervals is grouped to be equal to or longer than a pre-designated minimum length and the groups having consecutive similar values are bound into one interval again.

Then, a play speed is calculated on the basis of the content complexity by the computing part 307. And, the play speed is inverse-proportional to the content complexity. Subsequently, a frame number to be played in accordance with the play speed is computed by the frame number computing part 308. For instance, the frame number may be one of 0, 1, 2, 3, ..., 99, 100 provided that the play speed is 1. And, the frame number may be one of 0, 10, 20, ..., 90, 100 provided that the play speed is 10. Thus, the frame number to be played is reduced by being inverse-proportional to the play speed of the interval. Then the generated frame number information to be played of a video content is stored in the storage part 303 as an index file I-FF Description File from the index information generating part 309.

In this case, an index information structure is stored as <frame number to be played> which is stored as an index file by taking a frame number, which is selected for meet a play speed of a predetermined interval attained by being based on the content complexity, as a sequence.

After the index information has been stored by completing the indexing process of video, a user enables to watch a video at an intelligent fast-forward viewing mode using the index information.

The above operation is realized by changing the play speed automatically into various play speeds corresponding to the respective intervals by reading the I-FF index information in the skip player 304(310). The skip player 304 includes a control part 310 determines and controls a play speed using the index information from the storage part 303 and a display part 311 decoding to display the video stream of which fast-forward speed is controlled by the control part 310. The determination of the play speeds of the respective intervals in a video depends closely on the storage form of the index information.

If the index information is stored by the above first method, the corresponding interval is attained by a play speed value inverse-proportional to a content complexity value. If the index information is stored by the above second method, the stored play speed value is used as it is. And, if the indexing is carried out by the above third method, the corresponding frame sequence is decoded to play. Besides, there is another method of finding the average and standard deviation of the complexity of an entire video and a play speed as a relative value taking the average and standard deviation as references, thereby controlling the play speed.

When a play speed according to the case of storing the index information is attained by the above first or second method, the skip player 304 realizes this speed by regenerating the frames selectively. (The faster the play speed becomes, the less the frames are selected to play by taking the case that all the frames are played with a normal speed as a reference.)

In this case, a short shot is prevented from being omitted entirely by playing at least one designated frame of the shot.

For the selection of the frames, total play time T' of the frames classified to realize n times play speed is chosen to be equal to T/n wherein a play time of normal speed of a video is T, the frames are selected to be distributed equally in display time by considering decoding time of the respective picture types (Namely, I picture is selected with first priority than P or B picture is and P picture is selected preferentially than B picture is.), or picture types having short decoding time are selected preferentially to reduce the breaking-off caused by long decoding time of the pictures.

On the other hand, when the storage form of the index information is as good as that of the third method, the skip player 304 carries out the regeneration by the stored frame numbers. Thus, when the display is carried out by changing speeds into the indexed values for the respective intervals, a user comes into using a function of an intelligent fast-forward viewing I-FF which enables to play slow and fast in accordance with the complicated and simple content complexity, respectively (311).

Besides, a user enables to use additional functions to the intelligent fast-forward viewing (I-FF) such as 'a viewing faster than I-FF', 'a viewing slower than I-FF', 'a viewing with I-FF at a predetermined time' and the like. In order to realize these functions, a method of controlling a play speed value itself, a method of having a play speed value adjusted by controlling the complexity value influencing on the play speed, and a method of adjusting a frame sequence length itself may be used. As the complexity value determines a play speed, a method of varying a play speed by controlling the play speed value will be explained in the following description.

The 'viewing faster than I-FF' is realized by increasing the play speed values of the respective intervals at I-FF collectively, increasing the play speed values with a predetermined ratio or increasing just the play speed values of the specific intervals selectively. Otherwise, when the index information is defined by a sequence of the frame to be played, the sequence of the defined frame is increased with a predetermined ratio in the respective intervals of a video or in the specific intervals selectively.

The 'viewing slower than I-FF' is realized by decreasing the play speed values of the respective intervals at I-FF collectively, decreasing the play speed values with a predetermined ratio or decreasing just the play speed values of the specific intervals selectively. Otherwise, when the index information is defined by a sequence of the frame to be played, the sequence of the defined frame is decreased with a predetermined ratio in the respective intervals of a video or in the specific intervals selectively.

The additional control of the play speed may be accomplished by controlling the content complexity value as explained in the foregoing description. And, the controlled values such as play speed values and complexity values are stored again so as to be used as new values when the corresponding intervals start to be played.

The 'viewing with I-FF at a predetermined time' is realized by finding a ratio of a predicted time for the required time by means of predicting the time of automatic speed shift play with I-FF and then by increasing or decreasing a play speed at this ratio.

Namely, when a user sets a viewing limit time by the fast-forward play of a video, a (play) system computes a total consuming time of the fast-forward play of an entire video on the basis of the index information and then controls a speed of the fast-forward play to reach the limit time set by the user using the computed time and viewing limit time set by the user. Thus, an entire video content is regenerated with the fast-forward viewing during a pre-designated time.

Besides, the indexing process is carried out on one video only once and the video of which index is stored enables to use the I-FF function repeatedly by reading the index information.

The present invention finds the content complexity for the indexing by using motion information, shot information, face information, image text information, and audio information.

Namely, a method of finding context complexity according to the present invention uses the motion and shot information basically as well as face, image text and audio information additionally in accordance with class (genre), purpose, usage, characteristic and the like of a video.

(1) Using Motion Information

It is able to define motion information by expressing numerically the amount of motion in a (continuous) specific interval of a video. The motion information of the interval is expressed as an average value of the motion information of the respective frames. For an MPEG-1/2 video, a method of acquiring the motion information is defined by using the information of motion vectors, intra-coded macro-blocks, and not-coded macro-blocks.

The motion vectors of MPEG-1/2, which are a 2-dimensional vectors of the horizontal/vertical representing that each of the macro-blocks refers to which location of a reference picture when a frame is divided into 16×16 macro-blocks, is the information reflecting an object motion or a camera motion sufficiently.

Therefore, the direction of the motion vector reflects that of the object/camera motion and the size of the motion vector reflects that of the object/camera motion. Thus, the amount of direction of motion is expressed numerically by analyzing the motion vector value appearing in one frame.

However, all the macro-blocks of an MPEG-1/2 video fail to be coded as motion vector. The intra-coded macro-block, which is a macro-block having the original pixel information, is a not-coded part of motion vectors which is a new part appearing in a reference picture or beyond the motion vector search range, thereby varying greatly. Therefore, the intra-coded macro-block is considered as a maximum motion vector or a motion vector having a predetermined size such as an arbitrary value according to a usage and the like.

The not-coded macro-block us a part having no variation through several frames such as a caption, an icon and the like synthesized on natural moving pictures, which is considers as no-variation. Thus, this case may be considered as a motion vector having a predetermined size according to a usage or '0'.

Once the motion vector values are designated to the macro-blocks (intra-coded, not-coded), statistical values of motion vectors of the entire macro-blocks in a frame are found. Thus, the motion information of the continuous intervals, when the motion information is defined in the frame, is defined by an average value(considering time stamp) of the motion information in the frame.

Briefly, when the motion information is based on an amount of the numerically-expressed motion in one frame, the intra-coded macro-block uses a predetermined size such as an arbitrary value according to the size or usage of the maximum motion vector and the not-coded macro-block uses a predetermined size such as '0' or an arbitrary value according to a usage. Then, after the intra-coded and not-coded macro-blocks are regarded as motion vectors having fixed sizes, the amount of the numerically-expressed motion in one frame is defined by an average value of vector sizes including the rest of all macro-blocks.

Moreover, the numerically expressed motion information may be defined by an average value of motion information in the respective frames within the continuous specific intervals of a video. As explained in the foregoing description, the directions of the motion vectors reflect those of the camera and the sizes of the motion vectors reflect the sizes of the camera motion. Therefore, the camera motion information may be used for the numerically expressed motion information.

When the camera motion information is used, it is able to adjust the motion information of the corresponding interval. For instance, the motion information is adjusted to the direction inverse-proportional to the size of the camera motion, the motion information of the interval where a specific camera motion occurs is adjusted to the complicated direction, or the motion information of the interval where an unimportant specific camera motion occurs is adjusted to the simpler direction.

Thus, it is able to express numerically the content complexity in accordance with the amount degree of the motion by finding the motion information of the interval. And, the content complexity is determined by a value proportional to the amount of motion.

(2) Using Shot Information

A video content is logically divided into several story units in general. The story unit is so-called event or scene such as a shooting scene, a conversation scene and the like. Such scenes consist of connection of several sub-scenes or shots.

A shot means a sequence of video frames provided by a camera without interruption and is a most basic unit for analysis or construction of a video.

A video is constructed with a various connection of shots. Shot segmentation means a technique of separating a video into the respective individual shots. And, Shot clustering means a process for detecting logical story units of a video content by reconstructing the shots by logical scene unit on the basis of the individual shots and characteristics of the video content.

Therefore, content complexity may be defined by using shot segment information. A camera varies greatly when short shots found through the shot information extracting process show up consecutively. Thus, it is able to express numerically the content complexity of the interval as 'more complicated'. Otherwise, when the shot is long, it is able to express numerically the content complexity of the interval as 'simpler'.

(3) Using Face Information

It is able to modify content complexity using face detection information according to a video genre.

Magnified parts of faces in a sports video such as soccer, golf, baseball and the like are recognized easily by a user. Yet, motion information is determined as a relatively large part when using macro-block information of MPEG-1/2, thereby determining the content complexity as 'complicated'. Thus, it is able to adjust the content complexity as 'simpler' again. Then, the I-FF mode is played at 'faster speed'. In this case, it is generally considered that the face information includes specific object information. For instance, it is a scene in which an animal plays a role as a hero of a video movie.

(4) Using Text Information

It is able to modify content complexity using image text information according to a video genre. For instance, when an image caption showing scores in a sports video is traced, a part of which value is changed is an important part in meanings. Therefore, the content complexity is adjusted as 'more complicated'.(in this case, it is preferable to hold the scene interval before/after a fixed interval-score change centering around the score change.)

For another instance, as image text greater than a predetermined size often in a news video often includes core expressions about articles, it is able to adjust the content complexity of this interval as 'more complicated'. Thus, the I-FF mode is played at 'slower speed'.

(5) Using Audio Information

It is able to modify content complexity using image text information according to a video genre. For instance, the parts such as shouts of audience joy, applause, louder voice of an announcer and the like mean that important events take place. Therefore, the content complexity is adjusted as 'more complicated'. Then, the I-FF mode is played at 'slower speed'.

As explained in the above description, when shot information, face information of a character in a video (specific object information), audio information, text information or the like is additionally used for improving system performance, it is able to reflect the additional information according to the class (genre), usage, type and the like of a video automatically sp as to be used for determining content complexity and play speed. And, it is also able to control the adjustment of the play speed on the basis of the content complexity computed by reflecting the additional information by the designation and selection of a user through a user's interface.

In a related art, motion is defined by cut detection and differential pictures to control a play speed of a video in accordance with the image complexity, in which process time is taken longer by comparing all the pixels. Yet, the present invention defines motion vectors of MPEG-1/2 as macro-blocks consisting of 16×16 pixel areas, thereby reducing greatly the process time proportional to 'the number of macro-blocks'. And, the present invention is free from the mistake that the motion having large difference of background and color is regarded as a big one among motions despite the same object motions defined by differential pictures.

And, the I-FF function of the present invention enables to play automatically the part having substantially large content variance at a slower play speed and the other part which is simple or has substantially small content variance at a faster speed, thereby providing a user with fast viewing and information as much as possible.

When a fast-forward viewing is carried out with a general FF function, the part of which image content is complicated or variance is great is easy to be skipped. Therefore, a user has to stop FF and then play rewind for a while to watch. Yet, the I-FF function according to the present invention enables to play the complicated part which is easy to be omitted in an aspect of story development of a video at a slow speed, thereby providing a user with fast viewing without frequent manipulation.

Further, compared to a general FF function, the I-FF function of the present invention enables to play the complicated part at a slow speed in video search as well as the simple part at a faster speed so as to provide a user with precise and fast search.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling an intelligent fast-forward video system comprising:
   calculating complexity of a video story development based on motion information by sequentially indexing an entire video;
   determining a play speed using the calculated motion-based complexity; and
   variably controlling the play speed of the video based on the determined play speed,
   wherein the complexity is defined based on additional information on a length of shot segment, wherein the complexity is defined as simple in a case that a length of a shot segment is long and the complexity is defined as more complicated in a case that shots having short shot segments consecutively appear.

2. The method of claim 1, wherein the motion information is based on an amount of a numerically expressed motion in one frame of the video.

3. The method of claim 1, wherein the numerically expressed motion in one frame is defined by motion vectors and information on intra-coded macro-blocks and not-coded macro-blocks.

4. The method of claim 3, wherein the macro-blocks are considered as motion vectors having a predetermined size and the predetermined size of the motion vector is determined as one of a maximum motion vector size, an arbitrary value in accordance with usage, and '0'.

5. The method of claim 4, wherein the amount of the numerically expressed motion in one frame is defined by considering the intra-coded and not-coded macro-blocks as motion vectors having designated sizes and then by taking an average value of all vector sizes of all the remaining macro-blocks.

6. The method of claim 1, wherein the motion information is defined by an average value of motion information in the respective frames of an interval in specific consecutive intervals of the video.

7. The method of claim 6, wherein the motion information is camera motion information and wherein an adjustment of the motion information of a corresponding interval is carried out to be inverse-proportional to a size of the camera motion in accordance with importance of the camera motion.

8. The method of claim 7, wherein the motion information of an interval having an important specific camera motion is adjusted to be more complicated or the motion information of an interval having an unimportant specific camera motion is adjusted to be simpler.

9. The method of claim 1, wherein the complexity based on the motion information is adjusted by using additional information for improving performance such that face detection information of characters, audio information and image text information in case the complexity of the video story development is reflected on the motion information.

10. The method of claim 9, wherein (a) the motion information of a magnified face part is adjusted as simpler in case the complexity is adjusted using the face detection information, (b) the motion information of a part in which a size of the audio information increases is adjusted as more complicated in case the complexity is adjusted using the audio information, and (c) the motion information of a part in which a caption appears or is changed is adjusted as more complicated in case the content complexity is adjusted using the image text information.

11. The method of claim 1, wherein the play speed based on the content complexity is adjusted to be inverse-proportional to complexity of video information, to be an absolute value, or to be designated as a value relative to an average and a standard deviation of entire video complexity.

12. The method of claim 1, wherein frames to be played are selected based on the content complexity, and wherein (a) the frames are selected such that total play time T of the frames classified to realize n times play speed is chosen to be equal to T/n in case a play time of normal speed of a video is T, (b) the frames are selected to be equally distributed in display time by considering decoding time of the respective picture types, (c) picture types having short decoding, time are selected preferentially to reduce the black-out caused by long decoding time of the pictures, or (d) at least one frame of the shot is designated and played to prevent a short shot from being omitted entirely.

13. The method of claim 1, wherein the index information is defined by a specific interval of the video and image complexity of the interval, and wherein the play is carried out by (a) determining a play speed of a corresponding interval based on the image complexity information and then (b) selecting a frame to be played based on the determined play speed in the corresponding interval.

14. The method of claim 1, wherein the index information is defined by a specific interval of the video and a play speed of the specific interval, wherein the specific interval is played at a designated speed thereto.

15. The method of claim 1, wherein the index information is defined by a sequence of frames to be played and wherein the frame sequence to be played is sequentially played.

16. The method of claim 1, the method further comprising changing the play speed so as to support a user to view more slowly or faster than the play speed provided by the system by the user's adjustment of a content complexity value attained by the indexing information, wherein all values through entire intervals of the corresponding video are increased/decreased collectively or at a constant ratio by the user's adjustment or wherein specific image complexity values are increased/decreased selectively by the user's adjustment.

17. The method of claim 16, wherein the adjusted content complexity value is stored with information on the corresponding interval so as to be used as a new image complexity value when the corresponding interval starts to be played.

18. The method of claim 1, the method further comprising changing the play speed so as to support a user to view more slowly or faster than the play speed provided by the system by the user's adjustment of a play speed value attained by the indexing information, wherein all values through entire intervals of the corresponding video are increased/decreased collectively or at a constant ratio by the user's adjustment or wherein specific image complexity values are selectively increased/decreased by the user's adjustment.

19. The method of claim 18, wherein the adjusted play speed value is stored with information on the corresponding interval so as to be used as a new image complexity value when the corresponding interval starts to be played.

20. The method of claim 1, wherein the index information is defined by a sequence of frames to be played so as to provide a viewing speed faster or slower than the play speed provided by the system in accordance with the index information, and wherein the play speed is decreased or increased by increasing or decreasing the defined frame sequence in the respective intervals of the corresponding video with a constant ratio, or by increasing or decreasing the defined frame sequence in specific intervals selectively.

21. The method of claim 1, the method further comprising:
setting a viewing time limit of fast-forward play of the video;
computing a required time for fast-forward play of the entire video on the basis of the index information; and
adjusting the fast-forward play speed to reach the time limit using the computed time and viewing time limit.

22. In variably controlling a play speed of a video based on a content complexity of video story development as motion information obtained by indexing the entire video, a method of constructing index information for controlling an intelligent fast-forward viewing includes constituting the content complexity as index information defined as a predetermined form enabling to designate each play speed of the corresponding content complexity,
wherein the content complexity is defined based on additional information on a length of shot segment, wherein the content complexity is defined as simple in a case that a length of a shot segment is long and the content complexity is defined as more complicated in a case that shots having short shot segments consecutively appear.

23. The method of claim 22, wherein the index information is defined by (a) a specific interval of the video and an image complexity corresponding to the specific interval, (b) an interval and a play speed corresponding to the interval, or (c) a sequence of frames to be played.

24. An apparatus for controlling intelligent fast-forward viewing of a video comprising:
a means for calculating a complexity of video content in accordance with story development of a corresponding video from a digital video stream including at least motion information;
a means for storing the calculated content complexity; and
a means for playing and displaying the corresponding video in different play speeds for each specific interval on the basis of the stored content complexity,
wherein the content complexity is defined based on additional information on a length of shot segment, wherein the content complexity is defined as simple in a case that a length of a shot segment is long and the content complexity is defined as more complicated in a case that shots having short shot segments consecutively appear.

25. The apparatus of claim 24, wherein shot information, face information of characters, image text information and audio information are used for producing the content complexity.

26. The apparatus of claim 24, wherein the play speed is controlled by the content complexity computed by automatically reflecting additional information according to a genre or by reflecting, the additional information by a user's designation and selection.

27. The apparatus of claim 24, wherein the play speed is readjusted by a user's designation at a playing stage.

28. The apparatus of claim 24, the apparatus further comprising a producing means for generating information which designates a play speed for a specific interval of the corresponding video on the basis of the computed content complexity, wherein the corresponding video is played and displayed by adjusting the play speed for each of the specific intervals on the basis of the speed designation information.

29. The apparatus of claim 28, wherein the speed designation information is at least one of the specific interval of the video and image complexity in the specific interval, a speed value in the video interval and corresponding interval, or a frame sequence corresponding to the play speed.

30. The apparatus of claim 24, the apparatus further comprising:
a means for generating information which designates a play speed in a specific interval of the corresponding video on the basis of the computed content complexity; and
a means for calculating number of frame to be played on the basis of the generated play speed,
wherein the corresponding video is played and displayed on the basis of the frame number to be played.

* * * * *